United States Patent [19]

Liebermann

[11] 4,224,862
[45] Sep. 30, 1980

[54] APPARATUS FOR TRANSFERRING HEAT TO FOOD ARTICLES

[76] Inventor: Benno E. Liebermann, 2805 Lime Kiln La., Louisville, Ky. 40222

[21] Appl. No.: 835,808

[22] Filed: Sep. 22, 1977

[51] Int. Cl.$^3$ ............................................. A47J 27/21
[52] U.S. Cl. ....................................... 99/331; 99/346; 99/378; 99/473
[58] Field of Search ................. 99/331, 325, 334, 335, 99/346, 467, 468, 473, 474, 476, 483, 421 TP; 126/21 A, 246, 369, 378, 382, 33, 55; 219/370, 386, 387, 400, 401, 326, 378; 165/2, 3, 18, 26, 61, 74, 104 S

[56] References Cited

U.S. PATENT DOCUMENTS

| | | | |
|---|---|---|---|
| 1,459,466 | 6/1923 | Hodge | 126/378 |
| 2,313,798 | 3/1943 | Banks, Jr. | 126/378 X |
| 2,598,915 | 6/1952 | Huzenlaub et al. | 99/474 |
| 2,680,189 | 6/1954 | Williams | 126/21 A X |
| 3,030,486 | 4/1962 | Lashley | 219/401 X |
| 3,259,056 | 7/1966 | King | 99/421 TP X |
| 3,815,113 | 6/1974 | Welch | 99/421 TP X |
| 3,888,303 | 6/1975 | Skala | 165/2 |
| 3,943,842 | 3/1976 | Bills et al. | 99/473 |
| 3,962,962 | 6/1976 | Anderson | 99/483 X |
| 3,998,144 | 12/1976 | Curtis | 99/293 |
| 3,999,475 | 12/1976 | Roderick | 99/474 |
| 4,010,349 | 3/1977 | Lee | 99/474 X |
| 4,064,796 | 12/1977 | Jones | 99/346 |
| 4,088,444 | 5/1978 | Byrne | 99/370 X |
| 4,156,454 | 5/1979 | Skala | 165/2 |

*Primary Examiner*—Harvey C. Hornsby
*Assistant Examiner*—Arthur O. Henderson
*Attorney, Agent, or Firm*—Harry B. O'Donnell, III

[57] ABSTRACT

This invention provides novel apparatus for transferring heat to food articles. Basically, the novel apparatus of the present invention comprises: a chamber; support means for supporting food articles within the chamber; reservoir means for containing a liquid heat-transferring medium; heater means for heating the liquid medium contained in the reservoir means; pump means fluid-connected to the reservoir means and to radiator means located adjacent to the support means through hollow conduit means for circulating the liquid medium between the reservoir means and the radiator means; and control means connected to the heater means for controlling to within ±5° F. the desired temperature to which the liquid medium is to be heated and maintained by the heater means.

1 Claim, 5 Drawing Figures

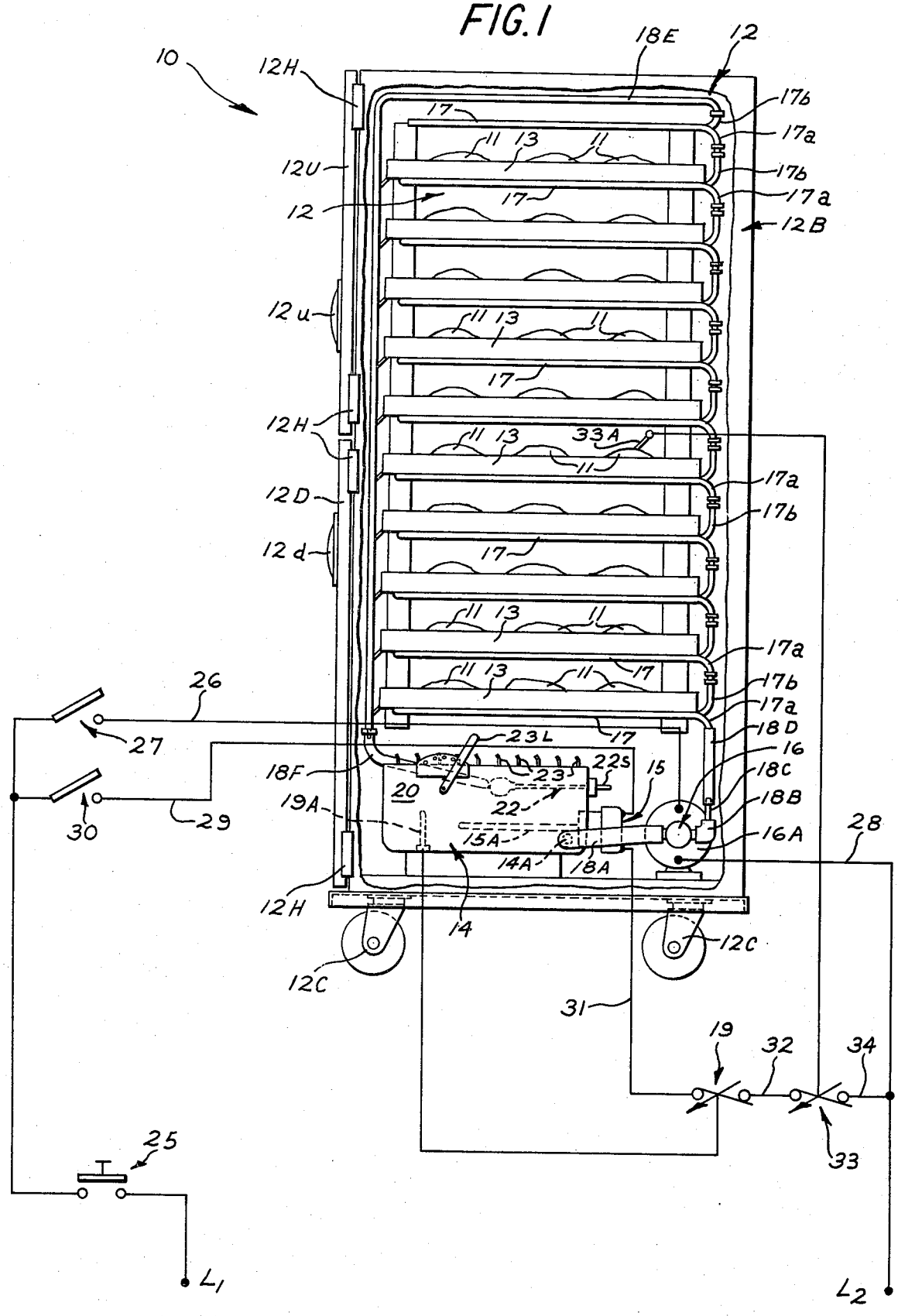

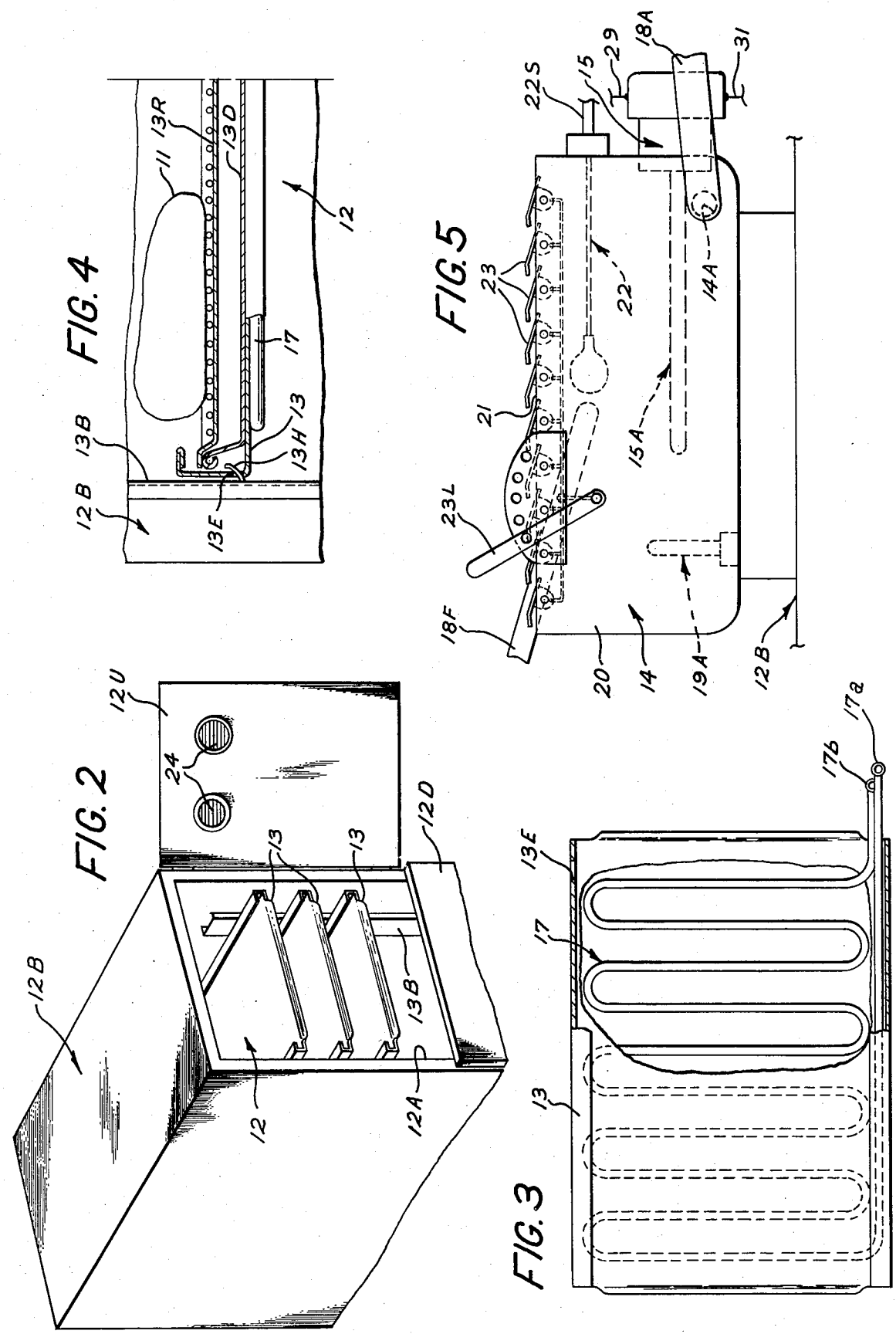

4,224,862

APPARATUS FOR TRANSFERRING HEAT TO FOOD ARTICLES

BACKGROUND OF THE INVENTION

This invention relates to apparatus for transferring heat to food articles and, more particularly, to a novel apparatus for such purpose that is particularly adapted for holding previously-cooked food articles quite near to a preferred temperature for prolonged time periods, and which can also be employed to initially cook food articles or to complete the cooking of food articles that have been previously partially cooked.

In the past, several forms of old apparatus have been provided for attempting to hold previously-cooked food articles near to a preferred temperature, which have been variously commonly referred to as "hot cabinets", "warming safes", "warming receptacles", "food heating carts", and "caterers' vehicles".

One recently quite popular form of such prior-art apparatus is marketed by Cresent Metal Products, Inc. of Cleveland, Ohio, as its Model H-138-CDD-1834 "hot cabinet", and basically comprises a vertically elongate cabinet or chamber, the exterior of the bottom of which is supported on casters for movement, and the interior of the bottom of which supports an electrically-powered blower that is located closely adjacent to an electrically-powered heater to thus circulate through the cabinet a heat-transferring medium consisting of heated air, which, in turn, passes over a plurality of horizontally-arranged, vertically spaced apart food article supporting trays that are mounted within the cabinet above the blower and the heater. And, the access opening which extends almost the entire height of the front of the cabinet is provided with a closure means that comprise a pair of hinged "dutch doors" for the stated purpose of minimizing the loss of the heated air from the cabinet interior while access is being obtained. Modified versions of this form of prior-art apparatus are also shown in U.S. Pat. Nos. 3,999,475 and 4,010,349, wherein means are also provided for regulating the relative humidity within the cabinet and transferring water vapor to the food articles supported therein which include sump means for containing water located adjacent to the interior of the cabinet bottom and having an opening fluid-connected to the cabinet interior.

With the just-described blower-circulated, electrically-heated air forms of prior-art apparatus, it has been most difficult to maintain food articles which are contained within the cabinet anywhere near to the preferred temperature when the cabinet access doors are opened by their users. There has also been considerable temperature variation between those food articles which have been supported in the upper and lower extremities of the cabinets of such prior-art forms of apparatus, with those supported lower in the cabinet and closer to the electric heater being kept warmer than those supported higher in the cabinet and, thus, farther away from the heater.

U.S. Pat. Nos. 377,594; 518,042; 1,223,311; 1,752,749; and 3,389,946 illustrate alternative forms of such prior-art apparatus wherein either steam or heated water, instead of heated air, is utilized for the heat-transferring medium. However, as shown and described in these last-mentioned five U.S. Patents, all of these additional prior-art forms of apparatus basically differ from the novel apparatus that is provided in accordance with the present invention, in that none of those old apparatus provides any pump means for circulating the steam or heated water that is employed as the heat-transferring medium between a reservoir in which the heat is supplied to the heat-transferring medium by heater means and radiator means by which the heat is transferred from the heat-transferring medium to the food articles that are supported within the cabinet or chamber nor any control means which are connected to the heater means of controlling to within ± a few °F. the desired temperature to which the heat-transferring medium is to be heated and maintained by the heater means.

Instead of providing pump means, these just-noted steam and heated water forms of prior-art apparatus rely upon thermal convection to cause circulation of the heat transferring medium between their reservoir and radiator means and, in order to obtain such convective circulation, the heated water or steam must be maintained at or quite near to 212° F. (the boiling point of water). And, since 212° F. is usually more than 60° F. higher than the preferred "holding" temperature of most food articles, these steam and heated water forms of prior-art apparatus can cause considerable undesired additional cooking or "overcooking" of cooked food articles which are held therein.

The U.S. Department of Agriculture has long determined that there is considerable danger of spoilage and salmonella (food poisoning bacteria) development in food articles which are held for even fairly short periods of time at temperatures ranging between 40° F. and 140° F. Quite recently, that same agency has increased this hazardous temperature limit to 145° F. for beef food articles. And, with all of the aforenoted forms of prior-art apparatus, problems have been encountered in attempting to maintain warm food articles held therein at temperatures above 140° F. without also causing considerable undesired additional cooking or "overcooking" of them.

The present invention is directed toward the provision of a novel apparatus for transferring heat to food articles, which is particularly adapted for holding previously-cooked food articles quite near to a preferred temperature for prolonged time periods and eliminates or greatly mitigates the aforenoted problems that have been encountered with prior-art apparatus which have been employed in an attempt to achieve that purpose, and which can also be employed to initially cook food articles or to complete the cooking of food articles that have been previously partially cooked.

SUMMARY OF THE INVENTION

The present invention provides novel apparatus for transferring heat to food articles. Basically, the novel apparatus of the present invention comprises: a chamber; support means for supporting food articles within the chamber; reservoir means for containing a liquid heat-transferring medium; heater means for heating the liquid medium contained in the reservoir means; pump means fluid-connected to the reservoir means and to radiator means located adjacent to the support means through hollow conduit means for circulating the liquid medium between the reservoir means and the radiator means; and control means connected to the heater means for controlling to within ±5° F. the desired temperature to which the liquid medium is to be heated and maintained by the heater means.

The novel apparatus of the present invention is particularly adapted for holding previously-cooked food articles quite near to a preferred temperature for prolonged time periods and can also be employed to initially cook food articles or to complete the cooking of food articles that have been previously partially cooked.

The novel apparatus of the present invention is especially adapted for transferring heat to chicken parts, with the employed liquid heat-transferring medium comprising water. However, it should be understood that it also may be utilized to transfer heat to a wide variety of other food articles, such as other meat parts, fish parts, whole vegetables or parts thereof, and the like, wherein water or other suitable substances are employed for the liquid heat-transferring medium.

It is desirable that the novel apparatus of the present invention also include means for regulating the relative humidity within its aforenoted chamber and for transferring water vapor to food articles supported therein comprising: sump means having an opening fluid-connected to the chamber for containing water; heating means for heating water contained in the sump means; means for regulating the amount of water that is contained within the sump means; means for regulating the amount of water vapor that passes through the opening from the sump means to the chamber; and vent means for regulating the amount of water vapor that escapes from the chamber. And, when the employed liquid heat-transferring medium is water, it is further desirable that the aforenoted sump means and heating means for heating water contained therein respectively also comprise its aforenoted reservoir means and the heater means for the liquid heat-transferring medium.

It is yet further desirable that the novel apparatus of the present invention include temperature sensing means for determining the temperature of at least one of the food articles that are supported within its aforenoted chamber and additional control means which are connected to the temperature sensing means and to its aforenoted heater means such that the additional control means are operable by the temperature sensing means to de-energize the heater means when a temperature not greater than 5° F. above a preferred temperature is sensed by it and to re-energize the heater means when a temperature not more than 5° F. below a preferred temperature is sensed by it.

BRIEF DESCRIPTION OF THE DRAWINGS

The present invention is illustrated in the accompanying drawings, wherein:

FIG. 1 is a somewhat schematic, partly broken, left side elevational view, including a basic diagramatic showing of the heater, pump and control means therefor, of a presently preferred form of the novel apparatus that is provided in accordance with the present invention;

FIG. 2 is a somewhat reduced fragmentary right front elevational perspective view of the upper portion of the chamber of the apparatus shown in FIG. 1, but with the upper chamber access door being shown in its open, rather than closed, position and with the drip pan and the overlying food article supporting rack of each of the illustrated food article support means having been removed from that portion of the chamber;

FIG. 3 is a somewhat enlarged, parlty broken, top plan view of one of the food article support means and an adjacent one of the radiator means of the apparatus shown in FIGS. 1 and 2;

FIG. 4 is a greatly enlarged fragmentary left front elevational view, partly in cross-section, of a portion of one of the food article support means and its adjacent radiator means of the apparatus shown in FIGS. 1 and 2, with the drip pan and overlying rack for that food article support means being shown installed within the chamber and the chamber access door being open; and FIG. 5 is a greatly enlarged fragmentary left side elevational view of the reservoir-sump means and the regulating means therefor of the apparatus shown in FIGS. 1 and 2.

DETAILED DESCRIPTION

Turning now to the drawings and, more particularly, to FIGS. 1–5 thereof, there is illustrated a presently preferred embodiment of a novel apparatus 10 that is provided in accordance with the present invention for transferring heat to food articles 11.

As illustrated, the apparatus 10 comprises: a chamber 12; support means 13 for supporting the food articles 11 within that chamber 12; reservoir means 14 for containing a liquid heat-transferring medium; heater means 15 for heating the liquid medium contained in the reservoir means 14; pump means 16 fluid-connected to the reservoir means 14 and to radiator means 17 located adjacent to the support means 13 through hollow conduit means 18A, 18B, 18C, 18D, 18E and 18F for circulating the liquid medium between the reserovir means 14 and the radiator means 17; and control means 19 and 19A connected to the heater means 15 for controlling to within ±5° F. the desired temperature to which the liquid medium is to be heated and maintained by the heater means 15.

The novel apparatus 10 of the present invention is particularly adapted for holding previously-cooked food articles quite near to a preferred temperature for prolonged time periods and can also be employed to initially cook food articles or to complete the cooking of food articles that have been previously partially cooked.

The novel apparatus 10 of the present invention is especially adapted for transferring heat to chicken parts, with the employed liquid heat-transferring medium that is circulated between the reservoir means 14 and the radiator means 17 by the pump means 16 comprising water. However, it should be understood that it also may be utilized to transfer heat to a wide variety of other food articles, such as other meat parts, fish parts, whole vegetables or parts thereof, and the like, wherein water or other suitable substances are employed for the circulated liquid heat-transferring medium. The food articles 11 may have their outer surfaces either uncoated or covered with a coating of a farinaceous material, such as breading, batter and the like.

As further shown in the drawings, the chamber 12 of the appartus 10 comprises the interior of a vertically elongate hollow-walled metal cabinet 12B that has its bottom supported on plural casters 12C for movement and the interior of the bottom of which supports the reservoir means 14 and the pump means 16. The cabinet 12B has an access opening 12A to the chamber 12 which extends almost the entire height of its front and is provided with closure means that comprise a pair of hollow metal "dutch doors", including an upper door 12U and a lower door 12D that are hinged to the right front corner of the cabinet 12B by hinges 12H and are respectively provided with handles 12u and 12d. And, the hollow metal cabinet 12B and the hollow metal access doors 12U and 12D are preferably provided with heat-insulating material between their interior and exterior walls to reduce the loss of heat from the chamber 12.

As best shown in FIGS. 1 and 5, the reservoir means 14 comprises a tank 20 for containing the liquid heat-transferring medium that is to be circulated between it and the radiator means 17 by the pump means 16. And, in the illustrated embodiment of the apparatus 10, wherein the preferred heat-transferring medium that is to be so circulated is water, this tank 20 has an opening 21 in its top that is fluid-connected to the chamber 12, such that this tank 20 of the reservoir means 14 can also serve as sump means for the means that are also provided in the illustrated embodiment of the apparatus 10 for regulating the relative humidity within the chamber 12 and transferring water vapor to the food articles 11 supported therein.

As further shown in FIGS. 1 and 5, water can be supplied to the tank 20 of the reservoir-sump means 14 via a float valve 22 that is connected to the tank 20 from a supply hose 22S that extends through the lower portion of the right side of the cabinet 12B and can be connected to a source of water (not shown), such as a water faucet of a building in which the apparatus 10 is to be employed. The float valve 22 is of a well-known construction and of a type very often utilized in a commode water storage tank and, in the illustrated embodiment of the apparatus 10, serves as means for regulating the amount of water that is contained within the tank 20 of the reservoir-sump means 14.

As still further illustrated in FIGS. 1 and 5, a jacketed electrically-powered heater element 15A of a well-known type is mounted within the tank 20 of the reservoir-sump means so as to permit its immersion within the water that is to be contained therein. Thus, when water is employed as the liquid heat-transferring medium is circulated between the reservoir means 14 and the radiator means 17 by the pump means 16, the heater element 15A serves both as the heater means 15 for heating the circulated liquid heat-transferring medium contained in the combined reservoir-sump means 14 and also as heating means for heating humidifying water contained therein.

As additionally shown in FIGS. 1 and 5, means, comprising a set of interlinked plural louvers 23 that are pivotally connected across the opening 21 through the top of the tank 20 of the reservoir-sump means 14, are provided for regulating the amount of water vapor that passes upwardly by convection through that opening 21 to the chamber 12. As best illustrated in FIG. 5, these louvers 23 are constructed to be adjustably set by a common operating lever 23L in a variety of positions ranging between minimum closure (FIG. 1) and maximum closure (FIG. 5) of the opening 21

And, as best shown in FIG. 2, vent means, comprising a pair of louvered circular vents 24 which extend through the upper portion of the upper access door 12U, are provided for regulating the amount of water vapor that escapes from the chamber 12 of the apparatus 10.

As shown in FIGS. 1–4, the support means 13 for supporting the food articles 11 within the chamber 12 comprise a plurality of metal shelves 13. Each such support means shelf 13 is made of a heat-conductive metal and is provided adjacent the front and rear ends of its upwardly bent left and right edges with eyes 13E that are selectively engageable with a plurality of vertically spaced-apart hooks 13H which are provided on a pair of bracket means 13B that are affixed adjacent to the front and rear ends of the interior left and right side walls of the cabinet 12B and extend vertically from just above the aforenoted opening 21 in the top of the tank 20 for the combined reservoir-sump means 14 to a location somewhat below the top of the chamber 12. With this arrangement, the plural support means shelves 13 can be generally horizontally mounted within the chamber 12 and selectively vertically spaced apart from one another therein by a variety of distances to thus accommodte various sizes of food articles 11. And, for each such support means shelf 13, there is also provided a drip pan 13D to rest atop of it together with an overlying rack 13R therefor upon which the food articles 11 are, in fact, seated.

As further illustrated in FIGS. 1 and 3–4, the radiator means 17 of the apparatus 10 comprises plural sections of hollow tubing. Eac such raditor means tubing section 17 is made of a highly heat-radiative and heat-conductive material, such as copper, aluminum or the like, and has been bent into a serpentine configuration between its inlet end 17a and its outlet end 17b. As shown, the bottom of each one of the aforenoted support means shelves 13 has affixed to it the top surface of one such serpentine radiator means tubing section 17. And, as further illustrated, each such radiator means tubing section 17 has its inlet end 17a and its outlet end 17b provided with coupling means such that it can be quickly fluid-connected in series with another like it or with one of the aforenoted hollow conduit means 18D or 18E which fluid connect the radiator means 17 with the reservoir means 14 and the pump means 16. With this arrangement, as best shown in FIG. 1, the food articles 11 can be supported on each support means shelf 13 within the chamber 12 with the heat being transferred to them by the radiator means tubing sections 17 that will thus be located adjacent to and on opposite sides (upper and lower) of each such support means shelf 13.

As yet further illustrated in FIGS. 1 and 5, the pump means 16 preferably comprises a centrifugal-type pump that is driven by an electrically-powered motor 16A. While various forms of such pumps may be utilized, good results have been obtained when employing one marketed by the Goulds Company that has a ½ horsepower motor to pump water at a flow rate of one gallon per minute at a discharge pressure of 30 p.s.i.g. The pump means 16 has its inlet or suction fluid-connected by the hollow conduit means 18A to an opening 14A that is provided in the lower portion of the tank 20 of the reservoir means 14. And, the outlet or discharge of the pump means 16 is fluid-connected to the inlet end 17a of the lowermost one of the aforedescribed radiator means tubing sections 17 via hollow conduit means 18B, 18C and 18D, with the discharge of the circulated liquid heat-transferring medium from the outlet end 17b of the uppermost one of the aforenoted radiator means tubing sections 17 being returned to the upper portion of the tank 20 of the reservoir means 14 through the conduit means 18E and 18F.

As basically diagramatically shown in FIG. 1, the electrically-powered heater means 15 and the electrically-powered drive motor 16A for the pump means 16 are connected in electrically parallel across an electrical-power source that is illustrated as lines $L_1$ and $L_2$, and a normally-open manually-operable "main" electrical switch 25 is provided for simultaneously electrically disconnecting and/or connecting both respectively from and to the source of electrical power.

As further basically diagramatically shown in FIG. 1, one of the two electrical terminals of the electrically-powered drive motor 16A for the pump means 16 is electrically connected to one of the two electrical power lines $L_1$, down-circuit of the "main" switch 25, through a conductor 26 and a manually-operable normally-open electrical switch 27 and the other electrical terminal of the pump means drive motor 16A is electrically connected to the other electrical power line $L_2$ through a conductor 28.

As yet further basically diagramatically shown in FIG. 1, one of the two electrical terminals of the electrical heater means 15 is electrically connected to one of the two electrical power lines $L_1$ down-circuit of the "main" switch 25 through a conductor 29 and a manually-operable normally-open electrical switch 30 and the other electrical terminal of the electrical heater means 15 is electrically connected to the other electrical power line $L_2$ through a conductor 31, the normally-closed thermally-actuatable switch 19 of the control means 19 and 19A, another conductor 32, another normally-closed thermally-actuatable switch 33 of a second control means 33 and 33A and yet another conductor 34.

The actuator of the switch 19 for the first of the aforenoted control means 19 and 19A is connected to and is operable by a first temperature-sensing means 19A that is mounted within the lower portion of the tank 20 of the combined reservoir-sump means 14 to sense the temperature of the liquid heat-transferring medium that is contained therein. The temperature at which the actuator of the switch 19 will be operated to open the switch 19 can be selectively manually adjusted by the operator of the novel apparatus 10 of the present invention. For example, when the employed circulated liquid heat-transferring medium is water and the food articles 11 are previously-cooked, coated chicken parts, this desired temperature may be 170° F. It is most desirable that the first of the aforenoted control means, which are comprised of the switch 19 and the temperature-sensing means 19A, be capable of controlling the operation (electrical energization and de-energization) of the heater means 15 so as to control the temperature of the liquid heat-transferring medium that is heated thereby to within not greater than ±5° F. (and, preferably, to within not greater than ±2° F.) of the desired temperature to which the liquid heat-transferring medium is to be heated and maintained by the heater means 15. For this purpose, good results have been obtained by employing for the switch 19 and its temperature-sensing actuator means 19A a control means that is sold as Model No. FD-10-CF-RP by Fenwal, Inc. of Ashland, Massachusetts U.S.A.

And, the actuator of the normally-closed termally-actuatable switch 33 of the second control means 33 and 33A is connected to and operable by a second temperature-sensing means 33A that is mounted within the chamber 12 and can be inserted into at least one of the food articles 11 supported therein by the support means 13 to sense the interior temperature thereof. The temperature at which the actuator of the switch 33 will be operated to open the switch 33 also can be selectively manually adjusted by the operator of the novel apparatus 10 of the present invention to a preferred temperature. This preferred temperature is the temperature which the operator wants to achieve and/or maintain at the center of the food article 11 into which the second temperature-sensing means 33A is inserted. When the apparatus 10 is employed to initially cook food articles or to complete the cooking of food articles that have been previously partially cooked, this preferred temperature is the so-called "doneness temperature" of the food article 11, e.g. for chicken parts, this "doneness temperature" is 186° F.; for beef parts, at least 145° F.; and for fish parts, 174° F. However, it should be understood that it is often preferred to hold food articles which have been previously fully cooked at a "holding temperature" that is lower than their "doneness temperature". Hence, it should be further understood that this preferred temperature for causing operation of the actuator of the switch 33 may be either the aforenoted "doneness temperature" or the aforenoted "holding temperature".

OPERATIONS

As previously noted above, the novel apparatus 10 of the present invention is particularly adapted for holding previously-cooked food articles quite near to a preferred temperature for prolonged periods of time. However, it can also be employed to initially cook food articles or to complete the cooking of food articles that have been previously partially cooked. In any event, the following initial procedure is followed in utilizing the novel apparatus 10 of the present invention.

First, the operator opens both of the access doors 12U and 12D to the chamber 12 and installs the food article support means shelves 13 and the radiator means tubing sections 17 within the cabinet, with the vertical spacing between them being arranged to accommodate the particular size of the food articles 11 to which heat is to be transferred by operation of the apparatus 10. This, of course, is done by hooking the eyes 13E of each such support means shelf 13 over appropriate ones of the hooks 13H that are provided on the brackets 13B within the chamber 12 and by fluid-connecting in series the inlet 17a and outlet 17b ends of the adjacent radiator means tubing sections 17. And, the fluid-connections are also made between the inlet end 17a of the lowermost such radiator means tubing section 17 and the hollow conduit member 18D and between the outlet end 17b of the uppermost one of such radiator means tubing section 17 and the hollow conduit member 18E.

Next, the operator connects the supply hose 22S to a source of pressurized water, such as a water faucet of the building in which the apparatus 10 is to be employed, and also electrically connects the apparatus 10 to a suitable source of electrical power.

Then, the operator inspects the tank 20 of the reservoir-sump means 14 to assure that it has been filled with a sufficient amount of water to immerse the heater element 15A through proper operation of the float valve 22.

Next, the operator manually adjusts the thermally-actuatable normally-closed electrical switches 19 and 33 to respectively provide the desired and the preferred opening temperatures therefor and also manually adjusts the operating lever 23L for the louvers 23 into the necessary position to regulate to the desired percentage the relative humidity within the chamber 12.

Then, the operator manually closes, first, the two normally-open mechanical operable electrical switches 27 and 30 and then, the "main" electrical switch 25, thus energizing the heater means 15 and the pump means 16.

The remaining steps that are to be performed by its operator in utilizing the novel apparatus 10 of the present invention, of course, vary, depending on whether it is to be used as "holding cabinet" for holding previously-cooked food articles quite near to a preferred temperature or, alternatively, as a "cooker" to initially cook food articles or to complete the cooking of food articles that have been previously partially cooked. Hence, these remaining operational steps are hereinafter described for each of these particular usages of the novel apparatus 10 of the present invention.

Holding Cabinet Operation

To use the apparatus 10 as a "holding cabinet" the operator next closes both of the chamber access doors 12U and 12D and allows the heater means 15 sufficient time to raise the temperature in the chamber 12 to the preferred temperature at which it is desired to hold the previously-cooked food articles 11. Assuming 62° F. tap water is used for the circulated liquid heat-transferring medium and the preferred temperature is that for holding previously-cooked, coated chicken food articles (150° F.), this will require several minutes.

After the preferred "holding temperature" has been sensed by the sensing means 33A as having been reached and continuing to be maintained within the chamber 12, the apparatus 10 is now ready to receive and "hold" the previously-cooked food articles 11.

Then, at a location outside of the chamber 12, such food articles 11 are seated on the plural racks 13R which, or course, are rested atop their respective drip pans 13D.

Next, the chamber access doors 12U and 12D are opened by the operator and the food article bearing assembled racks 13R and drip pans 13D are manually inserted by the operator into the chamber 12 to be horizontally supported therein by the support means shelves 13.

The access doors 12U and 12D are, of course, closed as soon as the support means shelves 13 adjacent to them have been loaded with the just-noted food article bearing assemblies of racks 13R and drip pans 13D. However, prior to that, the sensing means 33A is inserted into the center of one of the food articles 11.

Once the above-described steps have been performed by the operator of the novel apparatus 10 of the present invention, the pump means 16 will remain energized to continue circulating the liquid heat-transferring medium between the reservoir means 14 and the radiator means 17. And, the heater means 15 will remain energized, until either the first temperature-sensing means 19A senses that the desired temperature to which the liquid heat-transferring medium is to be heated (typically 20° F. higher than the preferred temperature at which the food articles 11 are to be held) has been reached and, then, causes the normally-closed thermally-actuatable adjustable electric switch 19 to open, or until the second temperature-sensing means 33A senses that the preferred temperature at which the food articles 11 are to be held (the "holding temperature") has been reached and, then, causes the second normally-closed thermally-actuatable adjustable electric switch 33 to open. These two thermally-actuatable switches 19 and 33 will, thereafter, be intermittently re-closed and re-opened by their respective temperature-sensing means 19A and 33A to cause such intermittent re-energization and de-energization of the heater means 15 as is necessary to either maintain the temperature of the liquid heat-transferring medium at within no more than ±5° F. (and, preferably, to within ±2° F.) of that desired or to maintain the temperature at which the food articles 11 are held at within no more than ±5° F. (and, preferably, to within ±2° F.) of the preferred "holding temperature".

With this arrangement, the "held" food articles 11 will be located within the chamber 12 of the novel apparatus 10 of the present invention on the support means shelves 13 with one of the radiator means tubing sections 17 being located closely adjacent to and on opposite sides (the upper and lower sides, as illustrated) of each such support means shelf 13. Hence, there will be little, if any, temperature variation between those food articles 11 which are "held" in the upper and lower portions of the chamber 12. And, perhaps even more importantly, such openings of the chamber access doors 12U and 12D as will be required, from time to time, to remove some of the "held" food articles 11 from the chamber 12, for service to a consumer thereof, will cause only very little, if any, temporary decrease in the temperature of the remaining "held" food articles 11 which continue to be retained within the chamber 12.

Cooker Operation

When using the novel apparatus 10 of the present invention as a "cooker", rather than as a "holding cabinet", its operator need not necessarily wait for the heating means 15 to raise the sensed temperature within the chamber 12 to the preferred "doneness temperature", e.g. 186° F. for uncoated chicken parts, before inserting the as yet not fully cooked food articles 11 therein.

Instead, the operator may, at a location outside of the chamber 12, seat the as yet not fully cooked food articles 11 on the plural racks 13R which, of course, are rested atop their respective drip pans 13D and manually insert into the chamber 12 the food article bearing assembled racks 13R and drip pans 13D to be horizontally supported therein by the support means shelves 13 any time after he has completed the last one of the aforedescribed initial procedure steps.

Then, the access doors 12U and 12D are, of course, closed just as soon as the support means shelves 13 adjacent to them have been loaded with the just-noted food article bearing assemblies of racks 13R and drip pans 13D. However, prior to that, the sensing means 33A is inserted into the center of one of the food articles 11.

Once this last-described step has been performed by the operator of the novel apparatus 10 of the present invention, the pump means 16 will remain energized to continue circulating the liquid heat-transferring medium between the reservoir means 14 and the radiator means 17. And, the heater means 15 will remain energized, until either the first temperature-sensing means 19A senses that the desired temperature to which the liquid heat-transferring medium is to be heated (typically 20° F. higher than the preferred "doneness temperature" of the food articles to be cooked) has been reached and, then, causes the normally-closed thermally-actuatable adjustable electric switch 19 to open, or until the second temperature-sensing means 33A senses that the food articles 11 have reached and are being maintained at the preferred "doneness temperature", and, then, causes the second normally-closed thermally-actuatable adjustable electric switch 33 to open. These two thermally-actuatable switches 19 and 33 will, thereafter, be intermittently re-closed and re-opened by their respective temperature-sensing means 19A and 33A to cause such intermittent re-energization and de-energization of the heater means 15 as is necessary to either maintain the temperature of the liquid heat-transferring medium at within no more than ±5° F. (and, preferably, to within ±2° F.) of that desired or to achieve and maintain the temperature at which the food articles 11 are to be cooked at within no more than ±5° F. (and, preferably, to within ±2° F.) of their particular preferred "doneness temperature".

Of course, once the operator of the novel apparatus 10 of the present invention observes that the sensing element 33A has indicated that the preferred "doneness temperature" for the food articles 11 has been reached and is being maintained, the operator may, then, cause the apparatus 10 to operate as a "holding cabinet" by manually resetting the adjustable normally-closed thermally-actuatable switch 33 such that its actuator will, thereafter, be operated when the temperature sensed by the sensing element 33A equals a preferred "holding temperature" for the now fully-cooked food articles 11, which "holding temperature" is usually quite a bit lower than the "doneness temperature" (some 36° F. lower, in the case of chicken parts, which have a preferred "doneness temperature" of 186° F. and a preferred "holding temperature" of 150° F.). And, at this same time, the operator preferably also manually resets the adjustable normally-closed thermally-actuatable switch 19 such that its actuator will be operated when the temperature sensed by its sensing element 19A equals a desired temperature that is typically 20° F. above the desired "holding temperature" for the now fully-cooked food articles 11.

The following are examples of preferred "doneness temperatures" which must be achieved and maintained for at least two minutes in order to fully cook the food articles 11 with the novel apparatus 10 of the present invention: fowl 186° F.; "medium-done" beef 155° F.; "well-done" beef 165° F.; pork 176° F.; and fish 174° F.

The preferred "holding temperature" at which the novel apparatus 10 of the present invention is particularly adapted to maintain the food articles 11 for prolonged periods of time ranges between 142° F. and 152° F.

And, the amount of water vapor that is transferred to the food articles 11 which can be both "cooked" and "held" by the novel apparatus 10 of the present invention can, of course, be controlled by regulating the percentage of relative humidity within its chamber 12 through selected positioning of the operating lever 23L for the louvers 23 that are pivotally mounted across the opening 21 atop its sump means 14, to thus control the "moistness" or "dryness" of those food articles 11 to a particularly preferred degree.

It should be apparent to those skilled in the art that while there has been described what presently is considered to be a presently preferred embodiment of this invention in accordance with the Patent Statutes, changes may be made in the disclosed apparatus without actually departing from the true spirit and scope of this invention. It is therefore intended that the appended claims shall cover such modifications and applications that may not depart from the true spirit and scope of the present invention.

What is claimed is:

1. Apparatus for transferring heat to food articles contained within a chamber without subjecting those food articles to a temperature exceeding 212° F. while maintaining the humidity within the chamber above that of the atmosphere outside of the chamber, comprising:
   (a) a chamber having vent means between it and the atmosphere outside thereof that are intended to be opened and closed;
   (b) a plurality of vertically spaced support means located in the upper portion of said chamber for supporting food articles within said chamber, said food support means being made of a heat conductive material;
   (c) radiator means located in the upper portion of said chamber adjacent to and on opposite sides of each of said load support means;
   (d) sump means located in the lower portion of said chamber for containing liquid water;
   (e) heater means located within said sump means;
   (f) control means connected to said heater means for controlling the desired temperature to which the liquid water is to be heated and maintained by said heater means, with said temperature not to exceed 212° F.;
   (g) means for regulating the amount of liquid water that is contained within said sump means;
   (h) hollow conduit means fluid-connecting said sump means and each of said radiator means and having a return conduit to said sump means to form a closed-loop transfer means;
   (i) pump means fluid-connected to said sump means and to said radiator means through said hollow conduit means for circulating the heated liquid water between said sump means and said radiator means and also returning the same to said sump means via said hollow conduit means such that hot water is continuously circulated through said chamber for heating food supported by said food support means; and
   (j) said sump means having an opening fluid-connected to said chamber through which water vapor produced therein can be first transferred from said sump means to said chamber and subsequently discharged from said chamber to the atmosphere outside of said chamber by operation of means for controlling flow through said opening between said sump means and said chamber and of said vent means, said means for controlling flow through said opening comprising a set of interlinked louvers pivotally connected across said opening and an operating lever connected to said louvers to adjustably vary the position of said louvers and thereby the opening between a variety of positions ranging between a minimum closure and a maximum closure of said opening, for regulating the amount of water vapor that passes upwardly by convection through said opening into said chamber for contact with said food articles.

* * * * *